United States Patent Office 3,554,994
Patented Jan. 12, 1971

3,554,994
PROCESS FOR ALTERING THE PARTICLE SIZE DISTRIBUTION OF ALPHA MONOOLEFIN POLYMERS
Richard P. Maloney, Chester, Habet M. Khelghatian, Springfield, and James F. Dempsey, Philadelphia, Pa., assignors, by direct and mesne assignments, to Standard Oil Company, Chicago, Ill., a corporation of Indiana
No Drawing. Filed Apr. 3, 1967, Ser. No. 627,653
Int. Cl. C08f 47/03
U.S. Cl. 260—93.7                                10 Claims

ABSTRACT OF THE DISCLOSURE

A process for rearranging the particle size distribution of finely divided solid alpha monoolefin polymers comprising heating a slurry of polymer wet cake and water to a temperature in the range of 35°–150° C. in a closed autoclave for the time necessary to precondition the polymer and thereafter shock cooling the heated slurry to provide a polymer powder having a changed particle size distribution in the range of 70 to 250 microns.

CROSS REFERENCES TO RELATED APPLICATIONS

The present application is a continuation-in-part of copending application Ser. No. 389,124, filed Aug. 12, 1964, now U.S. Pat. No. 3,322,720.

BACKGROUND OF THE INVENTION

This invention relates to a process for rearranging particle size distribution of finely divided powders of alpha olefin polymers and copolymers.

More particularly, this invention relates to a process by which a finely divided alpha olefin polymer powder having poor powder flow characteristics can be converted into a finely divided alpha olefin polymer powder having improved powder flow and processing characteristics.

Alpha monoolefins such as $C_2$ to $C_8$ olefins, including ethylene, propylene, butene-1, pentene-1, hexene-1, 4-methylpentene-1, and mixtures thereof, may be polymerized to high molecular weight polymers by the procedures and catalysts disclosed in U.S. Pats. Nos. 2,827,446; 2,996,491; 2,996,493; 3,055,878; 3,061,601; and 3,099,647; Belgian Pat. Nos. 3,533,362; 534,792; and 534,888; and others. In the polymerization process, the insoluble polymer precipitates from liquid components of the reaction medium in the form of finely divided particles characterized by particle diameters of less than 70 microns.

In the process of polymerizing alpha olefins, a small amount of the polymer product, which is substantially amorphous, is soluble in the inert polymerization solvent. In the process of separating the insoluble polymer powder from the polymerization liquid, e.g., by centrifuging, most of the soluble polymer is separated from the insoluble powder and is carried off with the polymerization liquid. However, a small portion of the soluble polymer remains in the polymer wet cake which is recovered after centrifuging of the polymer inert hydrocarbon liquid slurry. The wet cake usually contains from 20 to 80 weight percent of the polymerization liquid which contains from 1 to 5 percent of the soluble polymer. Substantially all of the soluble polymer may be separated from the insoluble polymer by subsequent reslurrying of the wet cake in fresh polymerization liquid followed by centrifuging to remove the added solvent and remaining soluble polymer. The wet cake, which is substantially free from soluble polymer, is then oven dried to remove any remaining polymerization liquid. The recovered product is a very finely divided polymer powder which is characterized by particle size diameter of less than 70 microns and can also be characterized by its poor flow properties which render it difficult to process in standard polymer finishing equipment.

If a wet cake from the above-disclosed centrifuging step containing some polymerization solvent and soluble polymer is oven dried without total removal of the soluble polymer fractions, the resulting dried powder is found to have a slightly different distribution of particle sizes. In the oven drying process, the polymer is heated and tumbled in an inert atmosphere at temperatures sufficient to drive off remaining volatile polymerization solvent. The removal of the polymerization solvent deposits the soluble, substantially amorphous polymer on the insoluble powder and thereby forms some agglomerates with the finely divided insoluble polymer powder.

The resulting dried powder is characterized as having a high concentration of fines; that is, particles having a diameter less than 70 microns and an equally large concentration of agglomerated particles having particle diameters greater than 250 microns and a small concentration of particles having a diameter falling within the range of 70 to 250 microns. This type of powder is also found to have poor flow characteristics and has been found difficult to process in standard polymer powder finishing machinery.

A known method of processing alpha olefin polymer powder to make large agglomerates of the powder consists of adding an antisolvent to the powder solvent slurry to precipitate the soluble polymer out of the polymerization solvent so that all of the polymer is recovered in the wet cake. However, the inclusion of relatively small concentrations, i.e., 2 to 10 percent, of amorphous soluble polymer in the finished insoluble powder has significant detrimental effects on the physical properties of molded specimens of that product. These detrimental effects contribute to an inferior product which renders such a polymer unattractive for commercial uses. It has been found that a finished polymer powder which has both good flow properties for extrusion and other purposes and an attractive bulk density range is a polymer powder whose particle sizes are substantially greater than 70 microns and preferably within the range of 70 to 250 microns.

U.S. Pat. No. 3,020,268 to Henry G. Schutz et al., relates to a process of agglomerating finely divided powder particles of alpha olefin polymers by heating the polymer in the presence of high boiling organic solvents and mixtures thereof and then cooling the polymer solvent slurry prior to recovering polymer powder. The Schutz et al. process contains several inherent processing and economic disadvantages which do not obtain when the process of the present invention is utilized.

Commercial polyolefin polymerization processes normally employ low boiling hydrocarbons such as pentane, heptane, or hexane, as polymerization diluents because of the relatively low cost of said hydrocarbon diluents and also because of the low solubility of crystalline polyolefins in said diluents. The Schutz et al. patent discloses that low-boiling hydrocarbons such as heptane are not effective for polymer powder agglomeration by the methods of their invention. Therefore, higher boiling hydrocarbons such as n-decane are a necessary part of the described process. The high cost of solvents such as decane, as well as the relatively high solubility of polyolefins in these solvents, prohibits their use in a commercial polyolefin polymerization process. In the commercial practice of the Schutz et al. process, it is economically advantageous to first polymerize olefin monomers in low-boiling hydrocarbon diluents and then remove the low-boiling hydrocarbon polymerization diluent from the solid polymer powder by centrifuging and filtration. The powder is then reslurried with the agglomerating medium, and the agglomeration process is accomplished. Recovery and purification of the agglomeration medium is a necessary step when such costly solvents are used.

U.S. Pat. 3,189,588 to Hull et al., relates to a process for agglomerating finely divided alpha olefin polymer powder which comprises heating the powder in the presence of water and the substantial absence of the polymerization liquid at temperatures 5°–15° C. below the Vicat softening point. This process provides polymer powder agglomerates in the size of 2 to 10 screen mesh (2000–9500 microns). The Hull et al. process unfortunately provides a product which in many instances is undesirable because of the large size of agglomerates produced. These large agglomerates inherently have a low surface area to volume ratio which usually requires a longer period of time and a higher temperature to put the polymer in a molten state. This situation of course is undesirable in high speed commercial processing and thereby places this type of polymer agglomerate at a decided disadvantage.

Generally, a polymer powder with a high ratio of surface area to volume melts rather quickly; however, this type of powder has extremely poor flow properties and is consequently very difficult to process. The large size powder particle also has many undesirable characteristics for commercial processing and is shown above. Thus it has been determined that a polymer powder that has both good flow characteristics and good melting characteristics should have a substantial amount of its powder particle distributed in the range of 70 to 250 microns.

The Hull et al. patent noted above fails to provide this type of powder agglomerate product.

DESCRIPTION OF THE INVENTION

It has now been discovered that solid alpha olefin polymers synthesized by the herein disclosed procedures and having particle size distributions which are not conducive for providing free-flowing properties can be processed to rearrange the particle size distribution of the powder, thereby resulting in a product having improved processing and flow property characteristics.

This invention relates to a process of rearranging the particle size distribution of polyolefin powder by agglomerating the finely divided powder particles into larger powder particles. The process comprises heating a substantially insoluble crystalline alpha monoolefin polymer powder in the presence of a small amount of a hydrocarbon polymerization liquid and a larger amount of water in a hermetically sealed autoclave. The heated slurry is agitated and subsequently shock cooled to form larger sized agglomerated polymer powder particles.

It has now been discovered that particle size distribution of finely divided alpha olefin polymer powder can be rearranged by a pressure-temperature treatment process. By this method previously insoluble polymer is made partially soluble by treating the polymer at elevated temperatures and superatmospheric pressure in the presence of the polymerization medium and a non-solvent such as water. The soluble polymer is subsequently reprecipitated to form agglomerates of larger particle size with the insoluble polymer powder particles by rapidly chilling or shock cooling the entire slurry. By shock cooling the heated slurry the dissolved polymer reprecipitates in the presence of the insoluble polymer powder causing agglomerating of the insoluble powder to change the particle size distribution of the entire powder and particularly in the 70 to 250 micron range.

The term "alpha olefin polymers" as is disclosed herein is meant to include homopolymers and copolymers of alpha monoolefins as well as mixtures thereof.

In accordance with the present invention a $C_2$ to $C_8$ alpha monoolefin or mixtures thereof is polymerized in the presence of an inert hydrocarbon liquid by a coordinated catalyst complex in the temperature range of 0 to 100° C., preferably 40 to 80° C., in the pressure range of 0 to 10 atmospheres and preferably 0 to 100 p.s.i.g. The resultant insoluble polymer precipitates from liquid components of the reaction medium in the form of finely divided particles having surface diameters of less than 100 microns. The polymer hydrocarbon slurry is subsequently treated with a polar medium such as alcohol or water to deactivate the catalyst. The resultant polymer powder is separated from the major portion of the liquid of the slurry by centrifuging or other means which leaves a polymer wet cake.

The polymer wet cake consisting of about 20 to 80 percent by weight of a finely divided alpha olefin polymer or copolymer powder and about 20 to 80 percent by weight of an inert solvent, such as $C_5$ to $C_9$ saturated hydrocarbons, and preferably a $C_5$ to $C_7$ paraffinic hydrocarbon, is slurried in an autoclave having means for agitation with at least equal volume of water, which can contain 0.001 to 1.0 weight percent surfactant and preferably contains 0.005 weight percent of a surfactant based on the weight of the added water. The autoclave is hermetically sealed and heated to the desired temperature within the range of 35° to 150° C. and agitated for a time necessary to solubilize a sufficient portion of the polymer so as to cause agglomeration of the insoluble powder particles when the soluble fraction is subsequently reprecipitated by shock cooling the entire slurry.

In the process of the present invention the temperature of the polymer-solvent water slurry is maintained within the range of 35°–150° C. in the sealed autoclave. The pressure in the sealed autoclave can be autogenous or can also be raised to superatmospheric levels by the addition of an inert gas to the otherwise sealed autoclave either prior to or during the heating process. The heated polymer slurry, after being heated and conditioned for the time necessary, is shock cooled to form the polymer powder agglomerates. It is theorized that by heating the contents of the sealed autoclave containing the slurry of surfactant, water, polymerization solvent and polymer powder to a temperature in the range of 35°–150° C., whereby superatmospheric pressure is generated in the autoclave, a fraction of the polymer powder not ordinarily soluble under standard temperature and pressure conditions becomes soluble and is dissolved in the liquid phase of the polymerization solvent portion of the slurry. When the slurry is shock cooled, the dissolved polymer precipitates and agglomerates a part of the finely divided insoluble polymer powder particles.

The actual function of the surfactant in the present process is not fully understood and is not a necessary part of this invention. However, it does appear that the addition of a surfactant to the polymer slurry prior to the agglomeration step contributes to larger particle formation and is, therefore, considered to be a part of the present invention.

By the term "shock cooling" is meant a rapid reduction in the temperature of the polymer slurry being processed. Generally, particle size rearrangement of finely divided solid alpha monoolefin polymer powders can be achieved in accordance with the present invention by the following procedures:

(a) To a volume of finely divided solid alpha monoolefin polymer wet cake containing 20 to 80 weight percent polymerization solvent is added 1 to 10 volumes of water to form a polymer-solvent-water slurry;

(b) The slurry is preconditioned by heating the polymer-solvent-water slurry in a sealed autoclave at a temperature in the range of 35 to 150° C. with the internal pressure of the autoclave being preferably between 0–100 p.s.i.g., said heating being for a time period necessary to condition the polymer for agglomeration; and (c) The slurry is shock cooled to agglomerate the polymer powder and thereby provide particle size rearrangement resulting in an improved polymer powder.

It is preferred that the polymer slurry be continuously agitated during all the above-disclosed processing steps. During the shock cooling step of the present invention the temperature of the entire slurry should be reduced at least 25° C. and preferably 25° to 75° C. in as short a time interval as possible. Generally, reduction in temperature of the preconditioned polymer is accomplished within 0.5 to 10 minutes according to the procedure employed.

Shock cooling can be accomplished by any one of several procedures, for example:

A volume of polymer powder containing 50 weight percent n-hexane is mixed with 2 volumes of water and is heated to 100° C. in a sealed autoclave for 0.5 hour and is subsequently displaced into a vented vessel containing 3 volumes of a chilled liquid at 25° C. The temperature drop in the heated polymer slurry resulting from the intimate mixing with the chilled liquid provides sufficient shock cooling to cause polymer agglomeration thereby resulting in a changed particle size distribution particularly in the particle size range of 70 to 250 microns.

The chilled liquid used in the shock cooling process can be either water or from $C_5$-$C_9$ low boiling hydrocarbons. An advantage can be gained by using low boiling hydrocarbons as the chilled liquid because of the hydrocarbons' substantially lower freezing point as compared to water.

For example, when n-hexane is the polymerization solvent in the polymer wet cake, hexane can also be used as the chilled liquid for the shock cooling step. Since the freezing point of n-hexane for example is $-95°$ C., hexane can be chilled to any temperature down to $-95°$ C. which will provide the desired shock cooling effect to the polymer slurry; and, of course, the colder the shock cooling liquid, the smaller the quantity needed to reduce the temperature of the polymer slurry.

To further illustrate the process of the present invention, the following examples are given:

EXAMPLE I

Propylene monomer is polymerized in a glass-lined, sealed reactor at a temperature of 70° C. and a pressure of 60 p.s.i.g. while dissolved in hexane and in the presence of a coordinated catalyst consisting of diethylaluminum chloride and titanium trichloride. The resultant polypropylene having a melting point of 172° C. is primarily isotactic with 92 percent of the polymer product being insoluble in hexane at the polymerization temperature. The polymer solvent slurry is discharged into a second reaction vessel (or kill tank) wherein the catalyst is deactivated by contacting the slurry with 10 volume percent of methanol. The polymer slurry is then discharged into a rotating centrifuge wherein a substantial part of the liquid phase of the polymer solvent slurry is removed, leaving a polymer wet cake.

A sample of the polypropylene powder wet cake prepared in the above-described manner and hereafter referred to as the control sample is analyzed and found to contain 51 percent by weight of volatiles. The control sample is subsequently dried in a heated vacuum oven for 24 hours and analyzed for particle size distribution after cooling to room temperature. The results of the particle size analysis are listed in the accompanying table.

EXAMPLE II

A sample of polypropylene powder wet cake prepared in the manner previously described in Example I and containing 51 percent volatile solvent is processed to rearrange particle size distribution in the following manner:

One thousand grams of polymer wet cake (about 1000 cc. vol.) are charged to a 21,000 cc. steam heated autoclave together with 1000 cc. of water. The autoclave is sealed and the polymer slurry is heated to 100° C. and maintained at that temperature with agitation for 1 hour. The entire polymer slurry while at 100° C. is then transferred from the first autoclave to a second autoclave containing 4000 cc. of water at 25° C. The resulting shock cooled mixture has a temperature of about 50° C. in less than 5 minutes. The polymer is then recovered from the shock cooled slurry by filtering. The recovered polymer is subsequently dried in a vacuum oven for 24 hours prior to being analyzed for particle size distribution. The results of the particle size analysis are presented in the table.

EXAMPLE III

A sample of polypropylene powder identical to that of Example I is processed in the identical manner as the polymer of Example II with the exception that the second autoclave contains 4000 cc. of n-hexane at 25° C. The results of the particle size analysis of the polymer powder recovered from this example are presented in the table.

A comparison of the results given in the table for Examples I, II and III illustrates the changes in particle size distribution in alpha monoolefin polymer powder achieved by the process of the present invention along with the improved characteristics of the powder resulting from the particle size rearrangement.

The term "surfactant" as used herein is meant to describe the classes of surface-active compounds generally used as wetting agents for polymers, the nature of said surfactants being well known to the art, and such agents generally having an oleophilic portion of the molecule usually of hydrocarbon nature and another polar portion which may be provided by various functional groups such as hydroxyl, sulphate, carboxyl, carbonyl, amino, nitro, amido, ether, sulphonate, phosphate, phosphite, etc. Examples of suitable classes of surface-active agents which can be employed in the present invention are disclosed in Surface Active Agents and Detergents, vol. II, by A. M. Schwartz, J. W. Perry, and J. Birch, published by Interscience Publishers, Inc, New York, N.Y. (1958), and in U.S. Pat. No. 2,961,397. The specific surfactant used in the processing of the examples disclosed herein is an ethylene oxide alkyl phenol condensate manufactured by General Dyestuff Corporation and sold under the trade name "Igepal CO 630."

The polymer product of each of the examples is evaluated with respect to its flow properties and processing characteristics by the following procedures:

(a) An elongated clear glass quart jar fitted with a cap is half filled with the powder to be evaluated. The jar is capped, placed in a horizontal position, and rotated or rolled slowly. If the powder flows freely in the jar in a manner similar to a liquid, with no bridging, build-up, or hang-up on the walls of the jar, it is termed a good flowing powder. If the powder flows unevenly in the jar with build-up and bridging occurring on the walls of the jar, the powder is judged to have poor flow properties.

(b) Processing characteristics of the polymer powder are arrived at by determining the quantity of powder which will feed through a screw type melt extruder. The rate at which a polymer powder can be melt extruded can be related to the flow properties and thereby to the processing characteristics of the powder.

Any commercially available melt extruder may be used in polymer flow evaluation. The melt extruder used in the present evaluation consisted of a 27-inch long, 2-inch outside diameter, heated barrel having a conventional conical hopper at one end and an 0.25-inch orifice at the other. The heated barrel contained a 0.75-inch screw and a means for rotation of said screw. Samples I–III, previously disclosed, were evaluated by the above given procedures, and the results are recorded in the table.

Particle size distributions of the polymer powders disclosed herein were determined by using a series of United States Standard sieves corresponding to the particle size ranges reported. The procedure of particle size determination using the above-mentioned sieves is well known to those skilled in the art.

TABLE

| | Processing conditions | | | Final temperature, °C. | Product particle size distribution, microns | | | | | Feed rate ¾" extruded lb./ hour | Characteristic flow properties |
| --- | --- | --- | --- | --- | --- | --- | --- | --- | --- | --- | --- |
| | Autoclave | | | | | | | | | | |
| | Temperature, °C. | Pressure, p.s.i.g. | Shock chill | | >210 | 105–210 | 75–105 | 44–74 | <44 | | |
| Example I | | Control | | 50 | 38.7 | 18.8 | 18.5 | 9.6 | 24.4 | 0.5 | Poor. |
| Example II | 100 | 28–32 | Water¹ | 50 | 43.6 | 28.4 | 15.9 | 9.3 | 2.8 | 1.0 | Good. |
| Example III | 100 | 28–32 | Hexane¹ | 50 | 41.9 | 32.1 | 13.5 | 8.4 | 4.1 | 1.0 | Do. |

¹ At 25° C.

We claim:
1. A method for rearranging the particle size distribution of crystalline alpha monoolefin polymer powder obtained by polymerization of $C_2$ to $C_8$ alpha monoolefin in the presence of an inert polymerization liquid and a coordination complex catalyst which comprises
   (a) adding to one volume of a wet cake of finely divided solid crystalline alpha monoolefin polymer powder having a content of particles having a diameter of less than 75 microns, and containing 20 to 80 percent by weight inert polymerization liquid, from about 1 to 10 volumes of water,
   (b) heating the slurry in a closed autoclave to a temperature in the range of 35 to 150° C. at superatmospheric pressure, while maintaining at least a portion of the powder in solid phase,
   (c) agitating said heated slurry for a period of time necessary to precondition the polymer, and
   (d) shock cooling the heated slurry by contacting said slurry with 1 to 10 volumes of a cooling liquid having a temperature of at least 25° C. below the temperature of the preconditioned slurry to agglomerate the polymer powder whereby a polymer powder having a different particle size distribution in the range of 75–250 microns and a greatly reduced content of particles having a diameter of less than 75 microns is recovered.
2. A method according to claim 1 wherein the shock cooling liquid is a $C_5$ to $C_7$ paraffinic hydrocarbon.
3. A method according to claim 1 wherein the cooling liquid is water.
4. A method according to claim 1 wherein the cooling liquid is a $C_5$ to $C_9$ hydrocarbon.
5. A method according to claim 1 wherein said superatmospheric pressure of the heated polymer slurry is from 0 to 100 p.s.i.g.
6. A method according to claim 1 wherein said alpha olefin is propylene.
7. A method according to claim 1 wherein said water contains from about 0.001 to 1.0 percent of a surfactant based on the weight of the water.
8. A method according to claim 1 wherein the said alpha monoolefin is propylene and said polymerization liquid is selected from the group consisting of $C_5$ to $C_7$ paraffinic hydrocarbons.
9. A method according to claim 8 wherein said superatmospheric pressure of the heated polymer slurry is from 0 to 100 p.s.i.g.
10. A method according to claim 8 wherein said water contains from about 0.001 to 1.0 percent of a surfactant based on the weight of the water.

References Cited

UNITED STATES PATENTS

| 3,008,946 | 11/1961 | Rhodes et al. | 260—94.9 |
| 3,244,687 | 5/1966 | Spindler | 260—94.9 |
| 3,422,049 | 1/1969 | McClain | 260—29.6 |
| 3,432,483 | 3/1969 | Peoples et al. | 260—87.3 |

JOSEPH L. SCHOFER, Primary Examiner

R. A. GAITHER, Assistant Examiner

U.S. Cl. X.R.

260—94.9